Patented Jan. 9, 1945

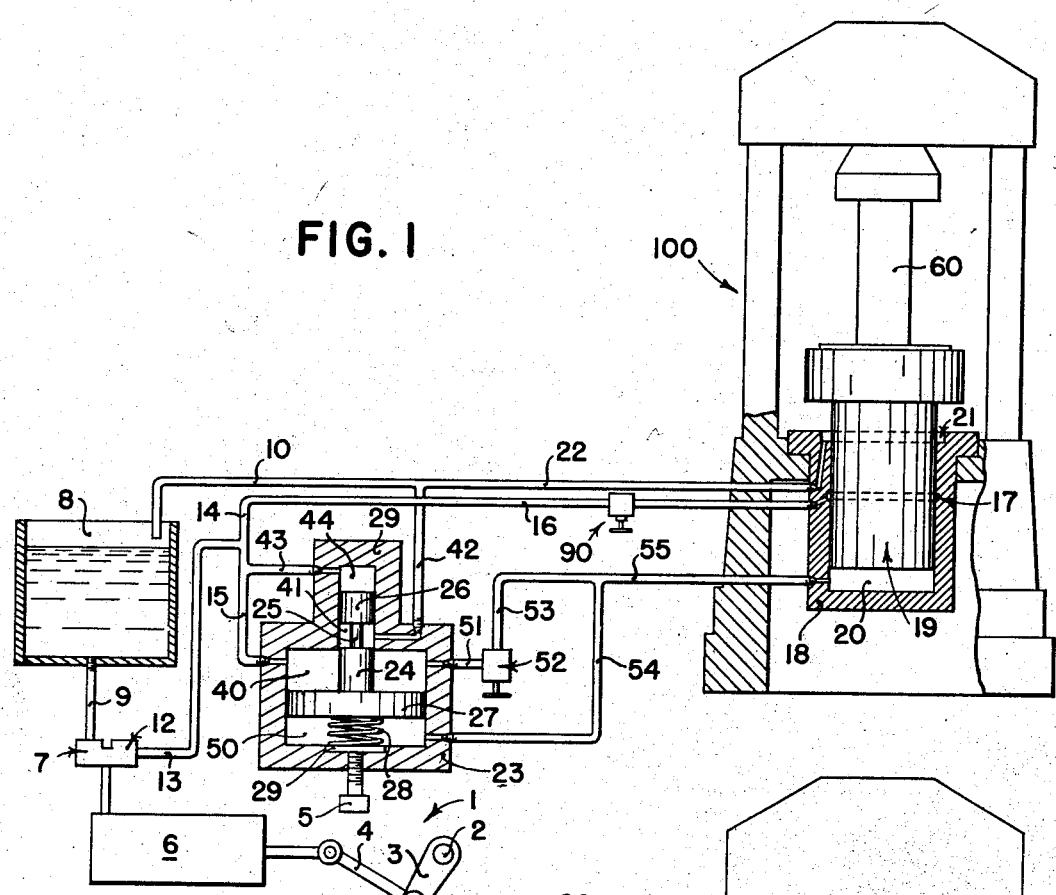
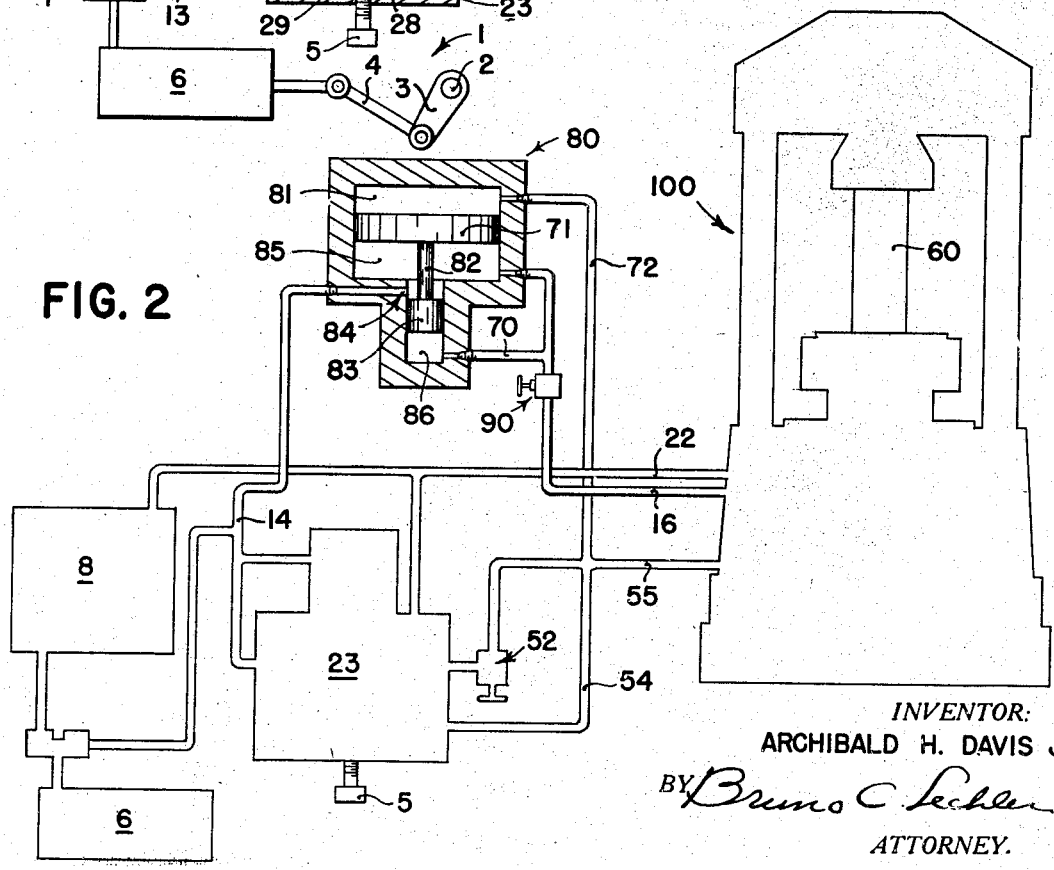

2,367,009

UNITED STATES PATENT OFFICE 2,367,009

FLUID SYSTEM CONTROL

Archibald H. Davis, Jr., Moline, Ill., assignor to American Machine and Metals, Inc., New York, N. Y., a corporation of Delaware Application March 22, 1941, Serial No. 384,692

2 Claims. (Cl. 60—52)

This invention relates to the control of the flow of fluid to a motor such as a cylinder whose piston is to move in proportion to the amount of fluid.

The object of the invention is to provide a control for a fluid supply to a cylinder in which a piston moves which will permit supplying fluid at a predetermined rate regardless of the resistance encountered by the fluid in doing its work. The desired rate of supply may be uniform or it may be variable according to a predetermined plan. It may, for example, be desired to vary the rate of supply at a uniform rate. It might be desired to feed for a fixed period at one rate and thereafter at a faster rate. It might be desired to operate according to some cyclical plan, the rate increasing and then decreasing. This cycle may be based upon time or it may be based upon the position a machine operated by the fluid has attained in its cycle.

A further object is to provide a control for liquid supplied to a fluid operated machine which will permit supplying liquid and incompressible fluid at a predetermined rate to secure a similar rate of movement of the machine. This would be the most commonly desired control when the fluid is a liquid, such as one used for moving a planer table, testing machine plungers, or the like.

A further object of the invention is to secure a constant rate of operation of a machine by providing a constant rate of supply in connection with a frictionless fluid packing such as disclosed in the applicant's prior application No. 334,333, filed May 10, 1940, and now abandoned.

A further object of the invention is to provide a control valve which maye be in the order of a needle valve, which may be calibrated for the rate of supply of fluid to the machine. To make this possible the invention provides means for continuously discharging the predetermined quantity through the valve without changing its setting and means to prevent varying leakage with changing counter pressure.

A further object of the invention is to provide a hydraulic universal testing machine control having a valve which may be set for a given rate of strain, either uniform or varying according to a predetermined scheme, without the necessity of providing a packing that absorbs part of the energy or making correction for the loss of liquid.

A further object of the invention is in a control system as described to provide a supplementary balanced valve which will give precisely the same pressure on the frictionless packing and under the plunger so as to eliminate even the slightest possibility of loss of fluid due to differential pressure.

A further object of the invention is to provide a combined balance valve and manual valve that permits a uniform flow for a given setting regardless of varying pressures on either the supply or discharge side.

When fluid is supplied to a cylinder containing a piston which moves against a varying resistance through a valve calibrated for various degrees of opening, the movement of the piston is not necessarily in proportion to the calibration. The inaccuracy may result from variation in the difference in pressure on the two sides of the valve causing a different rate of flow for a given setting. The inaccuracy may also result from loss of fluid between the walls of the cylinder and the piston, and this loss will vary with the pressure on the fluid behind the piston. Lastly, the inaccuracy may result from the compression of the fluid in the cylinder and in the system beyond the control valve.

Various methods have been developed for maintaining a constant pressure across the control valve eliminating the first of the three sources of inaccuracy enumerated. The loss of fluid between the cylinder and the piston can be prevented by the use of packing.

In many applications this is objectionable because of the friction created which absorbs part of the energy of the piston, and furthermore the packing may cause uneven movement as the resistance of the packing may not be uniform at all points in the stroke, and may be different at different speeds.

When no packing is used to prevent leakage between the piston and the cylinder wall, there is bound to be leakage. The rate of leakage will vary with the pressure. Therefore a control of the movement of the piston by controlling the supply of fluid to the cylinder is not possible unless this leakage is controlled.

The invention provides a means whereby loss of the measured fluid from under the piston is prevented without the use of a stuffing box.

The fluid under appropriate pressure is supplied to the space between the piston and cylinder wall from a source other than that which is supplied to the space back of the piston. This will provide the fluid needed for leakage and will create a counter pressure in an annular portion of the film between the piston and cylinder. If the pressure is chosen to approximate the pressure under the piston, there will be an annular section of fluid film held in place by the piston and the cylinder wall, the pressure of the fluid in the cylinder and the pressure of the fluid, for sealing against leakage.

The frictionless, leakage proof packing forms the subject of a co-pending application, Serial #334,333, filed May 10, 1940, and now abandoned.

Figure 1 shows the invention applied to a universal testing machine in elevation, partly diagrammatic, partly in section.

Figure 2 shows another form of the invention applied to a universal testing machine in elevation, also partly diagrammatic, partly in section.

Figure 3:
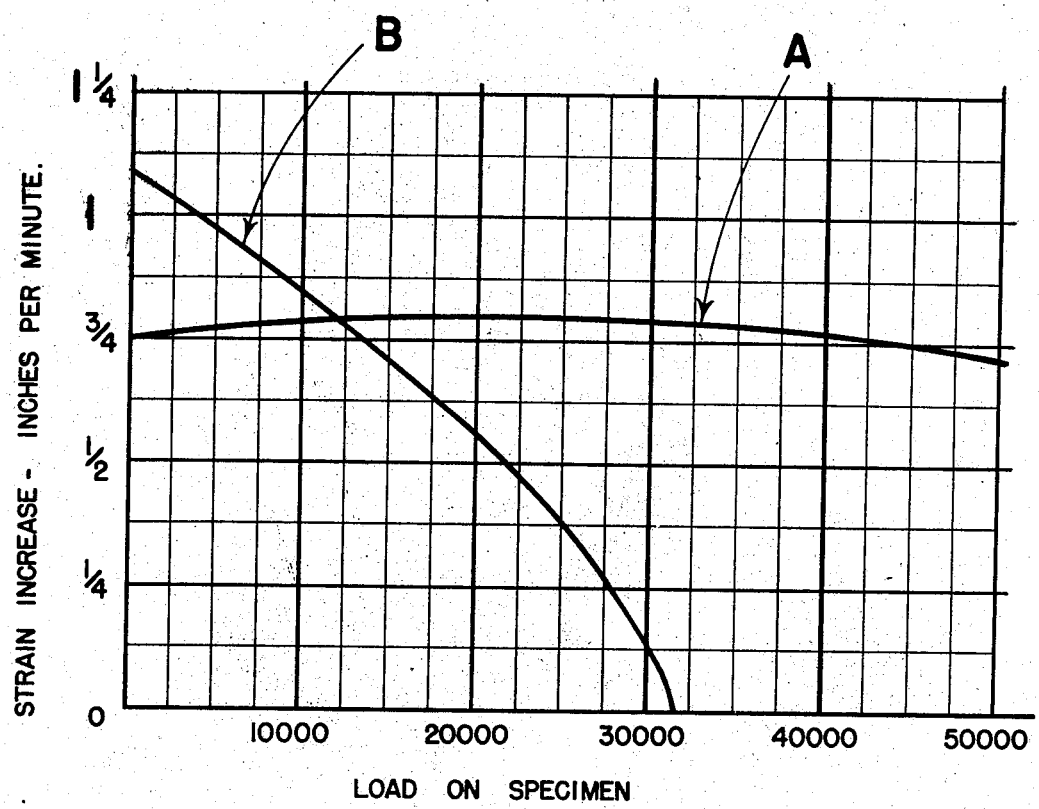
Figure 3 is a diagram showing the effect of the invention on the performance of a testing machine.

1 represents a source of power driving a fluid pressure pump 6. This may be a pump of any type. It may be a multi-cylinder pump driven from a shaft 2. For simplicity it is here shown diagrammatically as a single cylinder pump driven by a revolving shaft 2 which carries a crank arm 3 and a connecting link 4 that reciprocates a plunger in a pump cylinder 6.

Through line 9 a sump 8 feeds a chamber containing a check-valve 7 that permits the pump to draw fluid from the sump 8 but not to return fluid to it. On the return stroke of the pump the fluid is discharged through a check-valve 12 into manifold 13. This manifold supplies fluid to the three lines 14, 15 and 43. 43 and 15 lead into a balanced valve assembly generally indicated at 23. 14 leading into 16 extends to a frictionless packing groove 17 in a cylinder generally indicated at 18. Inside of the balanced valve assembly 23 is a piston assembly. This piston assembly includes a piston 27 sliding in a bore 50. Piston 27 carries a plunger 24 neatly fitted in bore 44. Joined to the plunger 24 by a connecting bar 25 is another plunger 26 of the same diameter as 24 moving in coaxial cylinder 29. The pressure of the fluid fed through line 43 to space 44 on the end of the small plunger 26 added to the pressure of the fluid in space 40, to which line 15 extends, upon the upper surface of the piston 27 is equivalent to the pressure on a disc of the full cross-section of bore 50. Otherwise expressed, line 43 and space 44 are intended only to balance pressures. A fluid line 54 to which reference will be made hereafter feeds fluid to the underside of piston 27. A spring 28 also presses on the underside of the disc.

It is obvious that if at any given instant the piston assembly including piston 27 plungers 26 and 24 is to be at rest, the pressure on the upper side of the piston, and therefore in the manifold 13 and in the lines directly connected thereto, must be greater than the pressure exerted on the under side of the piston by the fluid from line 54 in space 50 by the amount of the pressure exerted by spring 28 for otherwise the piston would either move downward, further compressing the spring, or the spring would move the piston upwards. The weight of the piston assembly is here neglected. Surrounding the connecting bar 25 is a space 41 connected through line 42 with line 10 that leads back to the sump 8. Into this same line 10 feeds a line 22 which carries any fluid that may have collected in the oil or fluid collecting groove 21. This groove is designed to catch any fluid that may have worked up along the side of the plunger. It should be noted that if the piston 27 moves down because the pressure in line 13 is more than sufficient to compress the spring 29, connection will be made between the space 40 and space 41 allowing some of the fluid to pass back to the sump. This connection acting as a relief valve, lowers the pressure in space 40. If this pressure is lowered to a point where the spring 28 plus the pressure coming through line 54 is able to overcome the pressure on the top of the piston, the small diameter plunger 24 completely shuts off the connection between 40 and 41 causing a build up in pressure until the normal condition is restored. The normal condition is that in which there is a small steady discharge through the relief valve formed by the plunger 24 in connection with bore 44. The control of the quantity by passing by the slight movement of the piston 27 maintains a uniform pressure differential between line 51 which leads to a control valve 52 and the discharge side of the valve connecting to line 53 which connects back through line 54 into the space 50 below the piston 27.

52 may be any type of control valve such as a needle valve, cock or any other type that can be conveniently set to vary the rate of discharge. Once this is set for a given rate of discharge, the rate of discharge will not vary regardless of the pressure that the ram 19 in the cylinder 18 meets as it tends to compress the specimen 60 in the testing machine 100. For, regardless of what be the pressure in space 20, or in manifold 13, the pressure differential across the valve, that is, the difference in the pressure between 51 and 53 must always be determined by the compression of the spring 28. With a given pressure differential, the liquid maintaining uniform characteristics, the discharge must necessarily be at a uniform rate.

Thus, the invention as thus far disclosed provides for feeding a uniform quantity of fluid into the line 55 regardless of the pressure against which it will be delivered.

The spring 28 in ordinary applications is selected to function with a given predetermined pressure and the variation in flow is taken care of in the setting of the valve 52. It is entirely possible, however, to provide this spring with a base plate 29 with means for compressing the spring such as a screw 5. If the setting of the valve 52 is kept constant by tightening the screw 5 or by releasing the screw 5, pressure on spring 28, and also the pressure across the valve 52 will change and hence the rate of delivery will also change. Thus I have provided means entirely independent of the setting of the valve for varying the quantity in a controlled fashion. Thus the operator may set the valve for uniform delivery and in order to more rapidly approach the specimen or cover a given portion of the range, may increase the flow by changing the setting of 5 and yet, upon restoring it to its initial position, have the same delivery that was initially determined by setting valve 52. Manual means of varying the spring tension are shown for ease of illustration. The principle is of much greater importance if the screw 5 is to be controlled by automatic means that will vary the setting according to a predetermined cycle while the operator retains control of the manual valve 52. Thus if the screw 5 be moved by a motor driven cam not shown it is possible to vary the delivery selected by the operator through the cycle according to this predetermining mechanism, and this delivery will be varied in the same proportion, regardless of whether the manual valve is wide open or partly closed.

Or, the screw 5 may be controlled by mechanism not shown controlled by the position of the plunger so that the operator determines the initial rate of movement of the plunger and then as it progresses through a given portion of its travel, the speed is increased in accordance with a predetermined cycle based on the position of the plunger. Thus I have provided a means for varying the delivery of the fluid through line 55 at a rate which varies according to a predetermined plan regardless of the resistance or loss of fluid that may take place in the apparatus which is fed by line 55.

The pressure in line 16, the same as in manifold 13 and the inlet side 51 of the control valve, is slightly higher than the pressure in line 55 by the uniform amount determined by the spring 28. This amount may be in the order of 10-30 pounds per square inch and does not vary even though the pressure in line 55 rises from zero to 3000 pounds. The fluid supplied to groove 17 is therefore always slightly above the pressure of the fluid supplied to space 20. The fluid pressure in groove 17 tends to cause a flow of fluid along the surface of the plunger 19. The plunger 19 is accurately fitted in the cylinder 18 so that the rate of leakage between the two is small because of the fluid resistance in flowing through a space which may be in the order of .0005". There is the same tendency for fluid to flow from the space 20 upward towards space 17. The rate of flow is a function of the difference of pressure between the two points between which the flow takes place. With a pressure differential of 30# between groove 17 and space 20 as contrasted with a pressure differential of up to 3000# between groove 17 and 21, the leakage from groove 17 into space 20 is negligible. The leakage that normally would take place from the space 20 to groove 21 now takes place between groove 17 and groove 21. As the fluid supplied to groove 17 does not pass through the needle valve 52, this leakage, groove 17 to groove 21, does not affect the accuracy of the control.

Figure 2 shows another form of the invention providing for the absolute equality of pressure in the leakage groove and in the space below the cylinder. There will therefore be no leakage whatsoever along the sides of the plunger from space 20. The parts in Figure 2 are the same as the parts in Figure 1 except that between the lines 14 and 16 another balancing valve generally indicated at 80 has been inserted. From the discharge side of the control valve 52 fluid is supplied not only to the balance valve 23 through line 54 but also to the newly added balance valve 80 through line 72.

Balance valve 80 is similar to 23 but has no spring. Inside of balance valve 80 is a piston assembly 71 sliding freely in the large bore 81 and carrying a smaller plunger 83 joined to it by a stem 82. Fluid passing from the pump to the fluid packing groove 17 now passes through line 14 and port 84 into the space 85 below the piston 71 and thence by line 16 to the fluid packing groove 17. A branch line 70 leads from line 16 into space 86 underneath plunger 83. Since the pressure in spaces 85 and 86 is the same, the piston 71 is subject to two forces, one tending to move the piston upwards and one tending to move the piston downward, each acting over the entire cross section of bore 81 or its equivalent. The force tending to move the piston downwards is the force that corresponds to the pressure in space 20 under the main ram for space 20 line 55, 72 and space 81 are all connected. The pressure tending to force the piston upward is the pressure in space 85 and 86 which is the same as in the fluid packing groove 17 with which it is connected by line 16. It follows that if the piston 71 is at rest the forces on it must be balanced and therefore, the pressure in the fluid packing groove must always be the same as the pressure under the plunger.

This equality is accomplished by cutting off in whole or in part by plunger 83 the port 84. As the piston rises, the port 84 is cut off in part creating a drop in pressure at that point, reducing the pressure in space 85 below the pressure in feed line 14 sufficiently to re-establish the balanced condition referred to.

Stated in another manner, in the construction shown in Figure 1 there is a slight inaccuracy because of the small difference in pressure between the fluid under the plunger and the fluid in the fluid packing groove. This difference being constant, it is readily corrected for and is not, in general, objectionable. In Figure 2 the addition of the extra balance valve 80 permits automatically dropping the pressure in the leakage groove to eliminate this flow differential.

Figure 3 shows a typical curve indicating the practical effect of equipping one application of this invention, a hydraulic universal testing machine using oil as the fluid, with the improved control. In order to demonstrate that with the combined features of the frictionless packing afforded by the leakage groove and a uniform rate of fluid delivered afforded by the balanced valve a uniform movement over a wide range of pressure can be achieved, typical curves A and B are shown. These are curves showing the rate at which the strain increased upon a specimen such as specimen 60 in a typical application to a universal testing machine, 100. In Figure 3 the ordinate represents the rate at which in a given test the specimen was shortened. The abscissa indicates the total load on the specimen at a given instant. The curves show the rate at which the specimen is being shortened when a given pressure is reached if the valve 52 is left set untouched after the test starts. If the curve, such as A, is substantially horizontal, it indicates that the machine is approaching perfection in that the specimen is being shortened at a constant rate from the initiation of the specimen up to the limits of the machine, or of the ability of the specimen to withstand the stress. In line 16, an ordinary globe valve 90 has been inserted so that by closing the valve, the fluid packing groove may be thrown out of operation. In that way the effect of the fluid packing groove as distinct from the effects of the constant rate of fluid control can be shown graphically. The curve A, practically horizontal, was achieved by opening valve 90 to permit free flow of fluid to the fluid packing groove and letting the rate of fluid delivery through valve 52 be constant throughout the test. The test was then repeated, opening the valve 52 somewhat wider and closing the valve 90 to prevent any fluid being delivered to the frictionless packing groove 17. Accordingly, as the rate of delivery through valve 52 is somewhat higher, curve B starts off with a faster rate of compression on the specimen. Before the pressure on the specimen has reached 10,000#, the rate of compression has slowed up appreciably because some of the fluid which is delivered at a constant rate is being lost by flowing up along the sides of the plunger. This loss increases with the rising pressure until, despite the wide opening of the control valve, at some higher pressure the rate of compression is no faster than in the previous experiments. As the pressure rises still further, the rate of compression keeps slowing up until when a pressure of 33,000# had been exerted in this particular test on the specimen, the compression increase had come to a stop. That is, with this setting of the valve no higher pressure than 33,000# could be achieved because as fast as oil was delivered to the plunger, it passed up along the side of the plunger into the leakage groove 21.

It would be necessary, in order to increase the pressure in test B over 33,000# to change the setting of the valve 52 during the test to give a higher delivery.

Thus it has been demonstrated that even though the rate of delivery to a hydraulic cylinder is maintained absolutely constant, that alone will not insure even an approximately uniform rate of forward movement of the ram when reliance is placed on the liquid film between cylinder and ram to retain the liquid in the cylinder.

To secure a constant rate of movement of the plunger the rate of delivery of fluid to the cylinder would have to be increased as the pressure increases during the loading of a specimen.

By using the frictionless fluid packing of the type here shown in connection with the constant rate of feed of fluid to the cylinder a much more nearly uniform rate of the ram is secured.

An application involving the use of oil in a testing machine has been selected by way of illustration and not limitation.

I claim:

1. Means for moving a ram at a controlled rate, regardless of the resistance encountered by the ram, to exert a pressure in exact response to a fluid pressure, comprising a cylinder, a ram freely sliding therein without mechanical packing, a groove in the cylinder wall covered by the ram, a conduit for feeding liquid under pressure having two branches, one leading to said cylinder under the ram, and a second one to said groove, whereby there is established an uninterrupted film of oil communicating with said first mentioned branch through said groove and extending to the end of the ram, a control valve in the first of said branches, and means actuated by the pressure differential across the control valve for maintaining that pressure differential at a pre-set value, and means in the second branch of said conduit responsive to the pressure beneath the ram for maintaining the pressure upon the upper end of said film equal to the pressure beneath said ram.

2. Means for moving a frictionless ram at a uniform rate, regardless of resistance encountered by the ram, comprising in combination a cylinder without stuffing box, a ram movable in the cylinder, said cylinder having a groove in the cylinder wall covered by the ram, a conduit carrying a fluid under pressure to the cylinder under the ram, a control valve in the conduit, a bypass in the conduit ahead of the control valve to bypass fluid to a sump whenever a pre-set pressure differential across the control valve is exceeded, an independent conduit carrying a fluid under pressure to the groove, a pressure reducer therein, means for setting the pressure reducer to give a fluid pressure in the groove which is controlled by the pressure under the ram, said pressure reducer including two pressure chambers separated by a movable wall, one pressure chamber connected with the space under the ram through a control conduit, the other pressure chamber connected with the groove, a source of fluid under pressure, a valve controlling the admission of fluid to the groove, the valve being actuated by the movable wall to admit fluid to the groove whenever the pressure in the groove falls below that under the ram.

ARCHIBALD H. DAVIS, Jr.